(12) United States Patent
Li (10) Patent No.: US 8,179,064 B2
(45) Date of Patent: May 15, 2012

(54) ELECTRIC MOTOR PROTECTION SYSTEM (75) Inventor: Wing Chung Li, Hong Kong (HK)

(73) Assignee: ARCFL Technology Limited, Hong Kong (HK)

( * ) Notice: Subject to any disclaimer, the term of this patent is extended or adjusted under 35 U.S.C. 154(b) by 573 days.

(21) Appl. No.: 12/418,624

(22) Filed: Apr. 6, 2009

(65) Prior Publication Data
US 2009/0189559 A1 Jul. 30, 2009

Related U.S. Application Data (63) Continuation-in-part of application No. 12/251,464, filed on Oct. 15, 2008.

(60) Provisional application No. 60/960,824, filed on Oct. 16, 2007.

(51) Int. Cl.
H02P 1/04 (2006.01)

(52) U.S. Cl. ......... 318/400.09; 318/400.07; 318/400.21; 318/400.22; 318/799

(58) Field of Classification Search ............. 318/400.01, 318/400.06, 400.07, 400.21, 280, 466, 721, 318/779, 799, 471, 400.22, 400.38, 400.09, 318/400.11, 400.12, 400.14, 432, 445, 801; 388/800, 842, 903, 934; 361/25
See application file for complete search history.

(56) References Cited

U.S. PATENT DOCUMENTS

| 5,019,757 | A | * | 5/1991 | Beifus | 318/400.07 |
| 5,828,200 | A | | 10/1998 | Ligman et al. | |
| 6,397,735 | B1 | | 6/2002 | Wong | |
| 6,402,365 | B1 | | 6/2002 | Wong | |
| 6,614,197 | B2 | * | 9/2003 | Berringer | 318/245 |
| 6,703,804 | B1 | * | 3/2004 | Courdier et al. | 318/445 |
| 6,806,664 | B2 | * | 10/2004 | Beishline | 318/280 |
| 7,112,934 | B2 | * | 9/2006 | Gilmore | 318/432 |
| 7,305,316 | B2 | * | 12/2007 | Frankel et al. | 702/99 |
| 2005/0283918 | A1 | | 12/2005 | Zhang et al. | |
| 2007/0182350 | A1 | * | 8/2007 | Patterson et al. | 318/432 |

FOREIGN PATENT DOCUMENTS

| DE | 3743396 | 6/1989 |
| DE | 4311219 | 10/1994 |
| GB | 2283378 | 5/1995 |
| JP | 2005323475 | 11/2005 |
| WO | 2008145511 | 12/2008 |

OTHER PUBLICATIONS

European Search Report of counterpart patent application.
European Examination Report for European Patent Application No. 10157650.2.

* cited by examiner

Primary Examiner — Walter Benson
Assistant Examiner — Antony M Paul (57) ABSTRACT An electric motor protection system for protecting an electric motor of a household appliance includes a temperature sensor for sensing a temperature of the electric motor, a motor speed sensor for sensing a speed of the electric motor, a current sensing circuit for sensing an electric current supplied to the electric motor, a power control device for controlling the electrical power supplied to the electric motor, and a signal processing unit electrically connected to the temperature sensor, the motor speed sensor, the current sensing circuit, and the power control device. The signal processing unit is configured to make calculations and judgments based on the measurements of the temperature sensor, the motor speed sensor and the current sensing circuit, and a plurality of predetermined values, and to control the power control device accordingly so as to protect the motor from overheating, being overloaded, or driven by excessive current.

5 Claims, 9 Drawing Sheets

ELECTRIC MOTOR PROTECTION SYSTEM

CROSS REFERENCE OF RELATED PATENT APPLICATION

The present patent application is a continuation-in-part application of U.S. patent application Ser. No. 12/251,464, filed on Oct. 15, 2008, which claims benefits of U.S. Provisional Patent Application No. 60/960,824, filed on Oct. 16, 2007.

FIELD OF THE PATENT APPLICATION

The present patent application relates to an electric motor protection system, and more particularly to a system for protecting an electric motor of a household appliance.

BACKGROUND

An electric motor of an electrical household appliance operates as an energy transducer, which converts electric energy to mechanical energy. The electric energy supplied to the electric motor is controlled through a semiconductor power device such as a TRIAC (Triode for Alternating Current) or a MOSFET (metal-oxide-semiconductor field-effect transistor). When the load to the electric motor changes, especially when the electric motor runs at a low speed and under a heavy load condition, the motor may generate too much heat and sometimes the motor can be burned due to the heating efficiency positive feedback. A conventional way to address this problem is to add a thermal fuse to protect the motor from being burned. Another conventional way to address this problem is to add a resettable fuse to avoid the motor damage. However, both of the conventional ways have disadvantages. Adding a thermal fuse can prevent the motor from being burned but can not avoid the motor damage. To add a resettable fuse can avoid the motor damage but the cost is quite high.

SUMMARY

The present patent application is directed to an electric motor protection system for protecting an electric motor of a household appliance. In one aspect, the electric motor protection system includes a temperature sensor for sensing a temperature of the electric motor, a power control device for controlling the electrical power supplied to the electric motor, and a signal processing unit electrically connected to the temperature sensor and the power control device. The signal processing unit is configured to control the power control device to shut off the electrical power supplied to the electric motor when the temperature sensed by the temperature sensor reaches a predetermined threshold value.

In one embodiment, the signal processing unit includes a microprocessor, a programmable read-only memory (PROM) or an erasable programmable read-only memory (EPROM), a random access memory (RAM), buffers and circuitry for reception and manipulation of various inputs and outputs.

In another embodiment, the temperature sensor is a negative temperature coefficient (NTC) temperature sensing assembly.

In yet another embodiment, the power control device includes a triode for alternating current (TRIAC), and the signal processing unit is configured to generate a triggering pulse to drive the power control device, which synchronizes with an alternating current (AC) zero-crossing signal.

In still another embodiment, the power control device includes a metal-oxide-semiconductor field-effect transistor (MOSFET), and the signal processing unit is configured to generate a pulse-width modulation (PWM) triggering pulse for the MOSFET in order to keep the running speed of the electric motor within a desired range.

In another aspect, the electric motor protection system includes a temperature sensor for sensing a temperature of the electric motor, a power control device for controlling the electrical power supplied to the electric motor, and a signal processing unit electrically connected to the temperature sensor and the power control device. The signal processing unit is configured to calculate a rising rate of the temperature sensed by the temperature sensor, and control the power control device to shut off the electrical power supplied to the electric motor when the calculated rising rate is equal to or greater than a predetermined threshold value.

In one embodiment, the rising rate is calculated as the ratio of the amount of temperature increase of the electric motor in a predetermined time period to the duration of that predetermined time period.

In another embodiment, the predetermined threshold value of the temperature rising rate is in linear relationship with the ratio of the difference between a predetermined maximum temperature of the electric motor and a previously measured temperature of the electric motor to the predetermined maximum temperature.

In yet another aspect, the electric motor protection system includes a motor speed sensor for sensing a speed of the electric motor, a power control device for controlling the electrical power supplied to the electric motor, and a signal processing unit electrically connected to the motor speed sensor and the power control device. The signal processing unit is configured to shut off the electric power supplied to the electric motor when the speed sensed by the motor speed sensor is zero or significantly lower than a predetermined target value for a predetermined period of time.

In one embodiment, when the speed of the electric motor sensed by the motor speed sensor is neither zero or significantly lower than the predetermined target value, the signal processing unit is configured to control power control device to adjust the power supplied to the electric motor so that the speed of the electric motor is in a desired range of speed values. The adjustment the power control device makes to the power supplied to the electric motor, when the speed of the electric motor sensed by the motor speed sensor is neither zero or significantly lower than the predetermined target value, is proportional to the ratio of the difference between the present speed of the electric motor and a center value of the desired range to the center value of the desired range.

In another embodiment, the motor speed sensor is a Hall effect sensor.

In still another aspect, the electric motor protection system includes a current sensing circuit for sensing an electric current supplied to the electric motor, a power control device for controlling the electrical power supplied to the electric motor, and a signal processing unit electrically connected to the current sensing circuit and the power control device. The signal processing unit is configured to calculate an average power consumption of the electric motor based on a predetermined voltage supplied to the electric motor and the current sensed by the current sensing circuit, and to shut off the electric power supplied to the electric motor when the calculated average power consumption of the electric motor reaches a predetermined threshold value for a predetermined period of time.

In one embodiment, the average power consumption of the electric motor is calculated by the signal processing unit by dividing the accumulative electric power supplied to the electric motor over a predetermined time period by the duration of the predetermined time period.

DETAILED DESCRIPTION

Reference will now be made in detail to preferred embodiment of the electric motor protection system disclosed in the present patent application, examples of which are also provided in the following description. Exemplary embodiments of the electric motor protection system disclosed in the present patent application are described in detail, although it will be apparent to those skilled in the relevant art that some features that are not particularly important to an understanding of the apparatus and method for producing simulating action effects may not be shown for the sake of clarity.

Furthermore, it should be understood that the electric motor protection system disclosed in the present patent application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the appended claims.

Figures 1A, 1B:
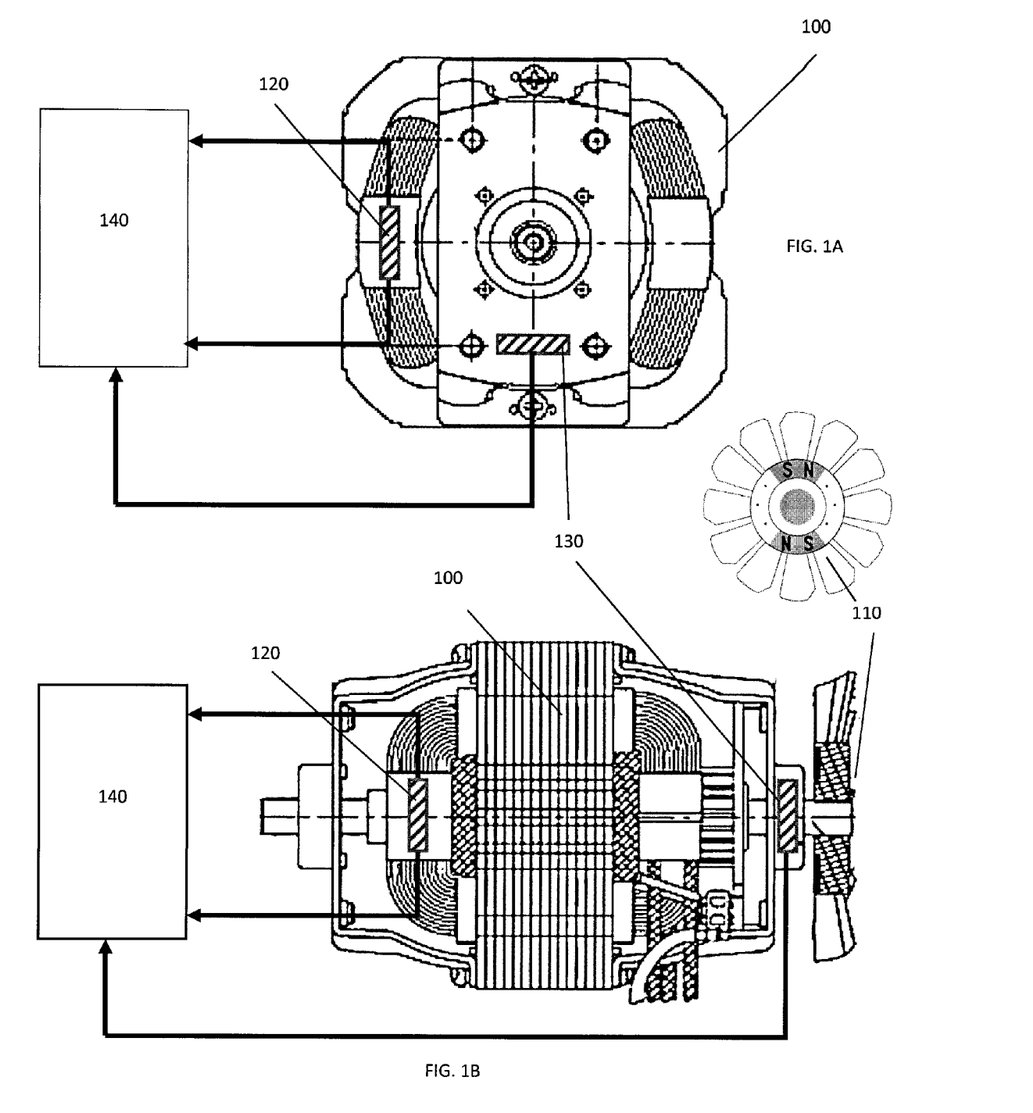
FIG. 1A and FIG. 1B are cross-sectional views of an electric motor protected by an electric motor protection system.
Figure 2A:
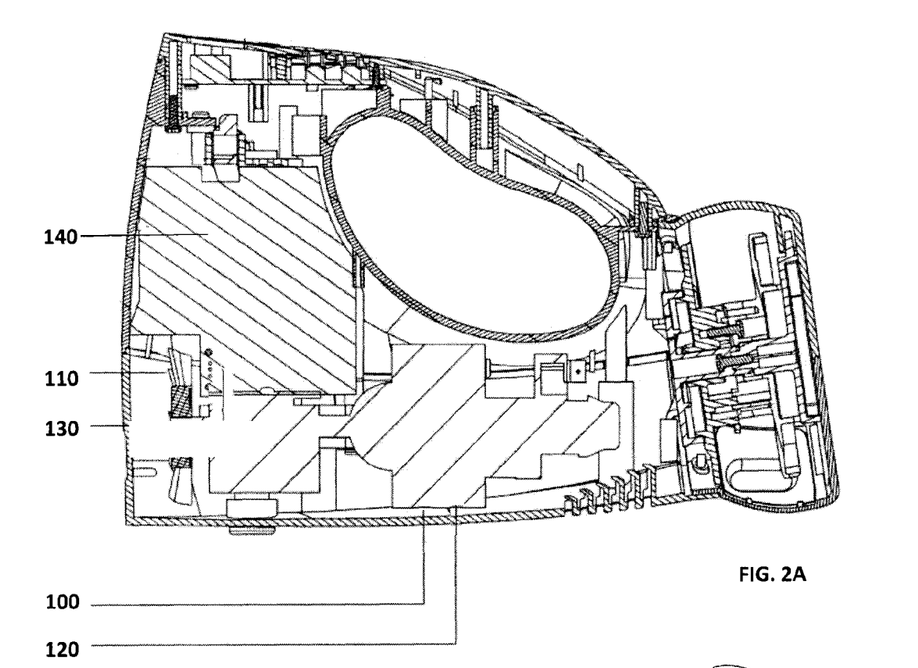
FIG. 2A and FIG. 2B are cross-sectional perspective views of an electric hand mixer having the electric motor depicted in FIG. 1A and FIG. 1B.
Figure 2B:
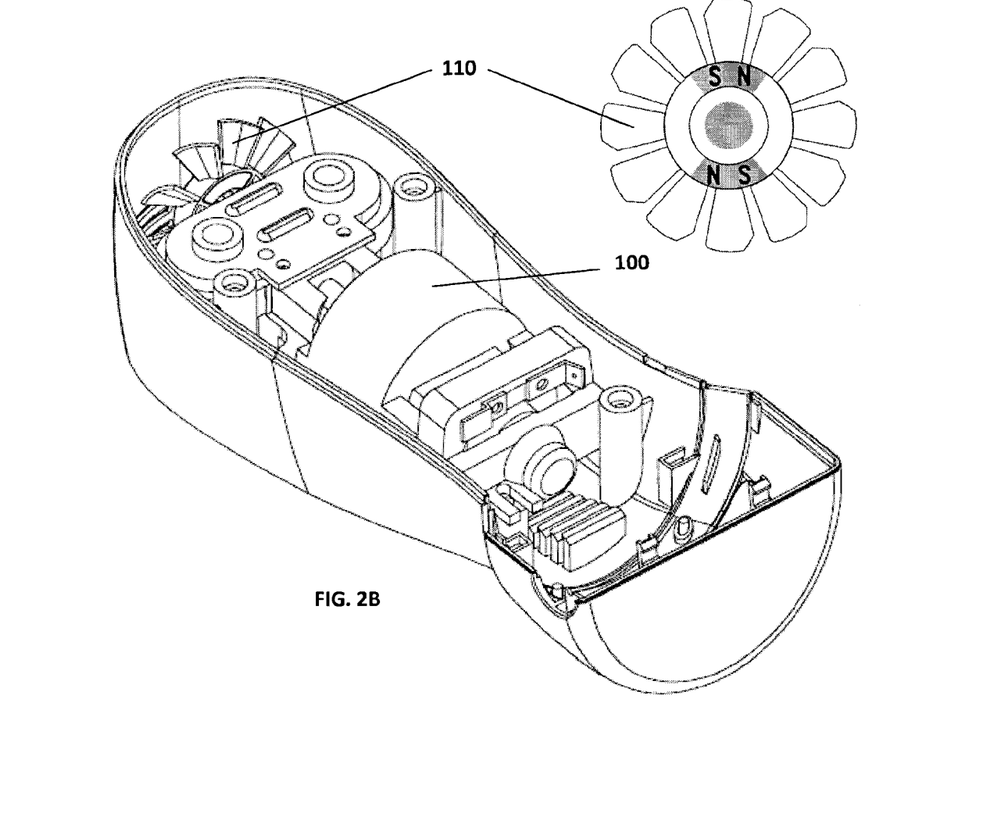

Referring more particularly to FIG. 1A and FIG. 1B, an embodiment of the present patent application provides an electric motor protection system for protecting an electric drive motor 100. The electric motor protection system includes a motor fan 110, a temperature sensor assembly 120, a motor speed sensor 130, and a motor control unit 140. The electric motor 100 can be used in an electric household appliance such as an electric hand mixer as illustrated in FIG. 2A and FIG. 2B.

Figure 3:
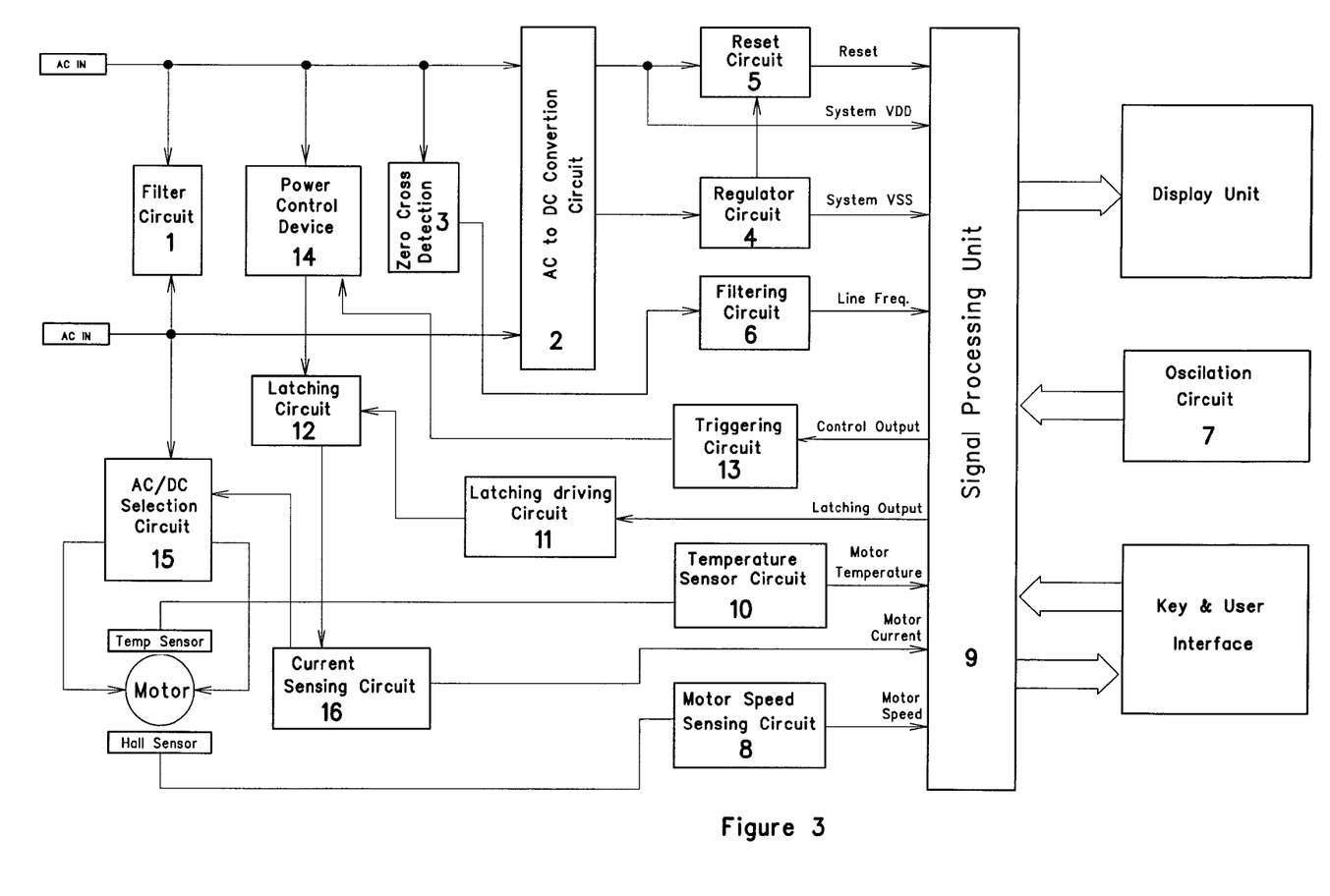
FIG. 3 is a functional block diagram of the electric motor protection system according to an embodiment of the present patent application.
Figure 4:
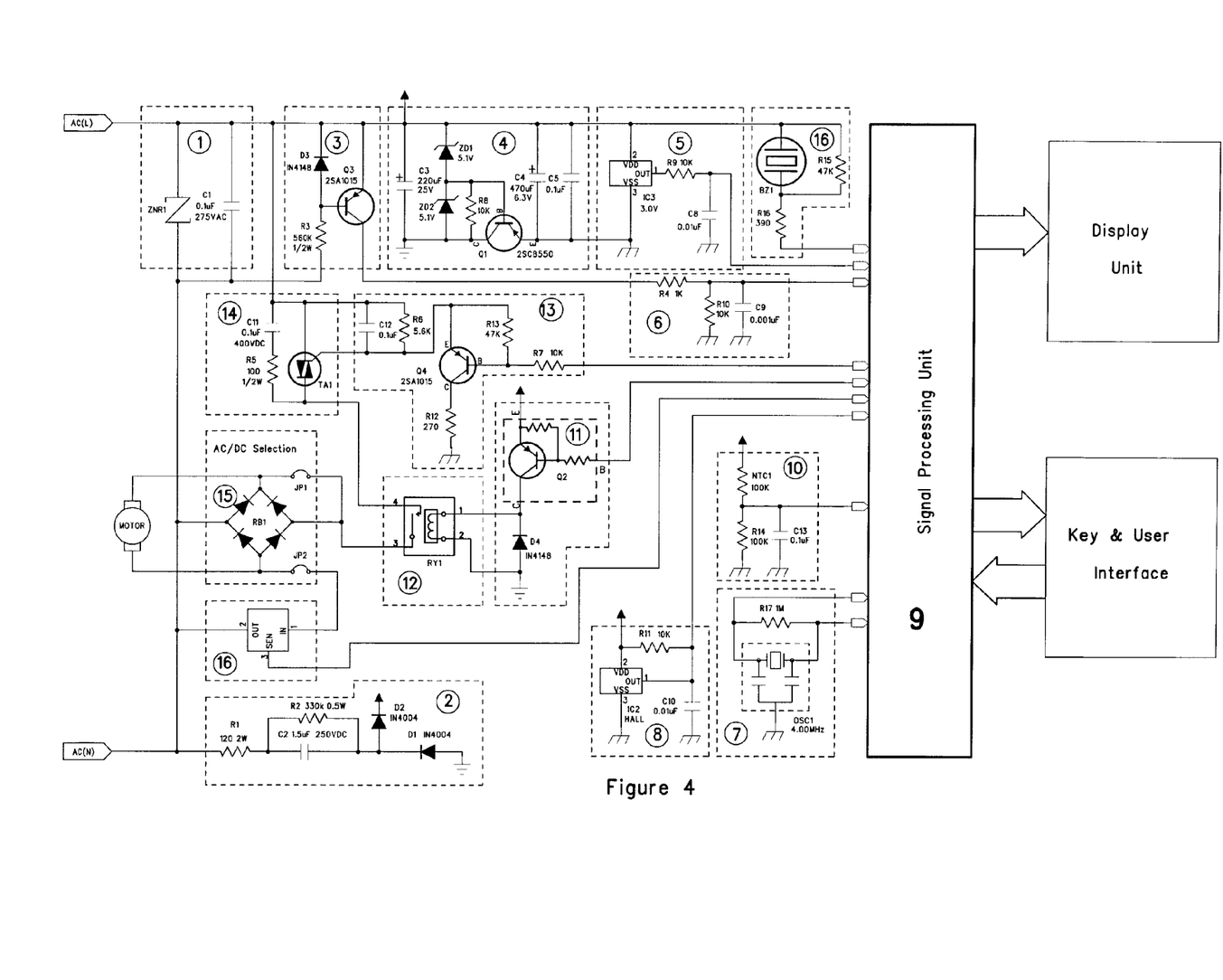
FIG. 4 is a circuit schematic diagram of the electric motor protection system depicted in FIG. 3.

The various capabilities and functional components of the electric motor protection system are best introduced with reference to the functional blocks as shown in FIG. 3 and the circuit schematic diagram as shown in FIG. 4.

Referring to FIG. 3 and FIG. 4, incoming alternating current (AC) is converted to direct current (DC) in a converter circuit 2 and applied to the electronic portions of the electric motor protection system. A regulator circuit 4 conditions and regulates the DC power provided to a system signal processing unit 9, which can be a micro-controller or a combinational circuit with capabilities of value processing and time calculation. A function of the signal processing unit 9 is to provide a latching signal and a triggering signal respectively to a latching driving circuit 11 and power control device 14. A zero detection circuit 3 and a filtering circuit 6 are configured to provide a shaped signal to the signal processing unit 9 corresponding to each zero-cross of the household AC current. This shaped signal is used by the signal processing unit 9 to synchronize a TRIAC driving circuit 13 with the household AC if a TRIAC is used as a power control device. The signal processing unit 9 sends trigger signals to the TRIAC triggering circuit 13 to advance or retard the triggering (turn-on) point of the TRIAC 14. An advanced triggering point increases power supplied to the motor 100, while a retarded triggering point decreases power supplied to the motor 100. The motor 100 is driven at higher speeds when higher power is supplied and at lower speeds when lower power is supplied. This enables the signal processing unit 9 to alter motor speed electronically.

In addition, a current sensing circuit 16 is connected to the signal processing unit 9 and configured for sensing the electric current supplied to the motor 100, so that the signal processing unit 9 can perform operations protecting the electric motor 100 based on the current supplied to the motor 100. Such operations are described more in detail hereafter.

The temperature sensor assembly 120, in this embodiment a NTC (negative temperature coefficient) temperature sensing assembly, senses the temperature of the electric motor 100 and transmits a signal T representing the temperature sensed by the temperature sensor assembly 120 to the signal processing unit 9, so that the signal processing unit 9 can perform operations protecting the electric motor 100 based on the temperature of the electric motor 100. Such operations are described more in detail hereafter.

The motor speed sensor 130, in this embodiment a Hall effect sensor, includes a motor speed sensing circuit 8 and is configured to sense the motor 100's actual running speed in an operation mode. The motor speed sensor 130 generates a motor speed feedback signal $F_i$ representing the speed of the motor 100 sensed by the motor speed sensor 130, and transmits the signal $F_i$ to the signal processing unit 9, so that the signal processing unit 9 can perform operations protecting the electric motor 100 based on the speed of the electric motor 100. Such operations are described more in detail hereafter.

In the illustrated embodiment, the signal processing unit 9 includes a micro-controller, which incorporates a microprocessor, a programmable read-only memory (PROM) or an erasable programmable read-only memory (EPROM) and a random access memory (RAM), as well as buffers and circuitry for reception and manipulation of various inputs and outputs. The RAM memory is volatile, or as known in the art, a temporary storage for data. Resetting the micro-controller or removing power from the electric motor protection system erases what is stored in the RAM. The microprocessor, memory, buffers and circuitry are typically incorporated into a single integrated circuit chip package. Instructions or programs can be installed in the programmable memory and executed to perform different types of motor protection operations. These instructions or programs will be discussed below with reference to FIGS. 5-9.

Figure 5:
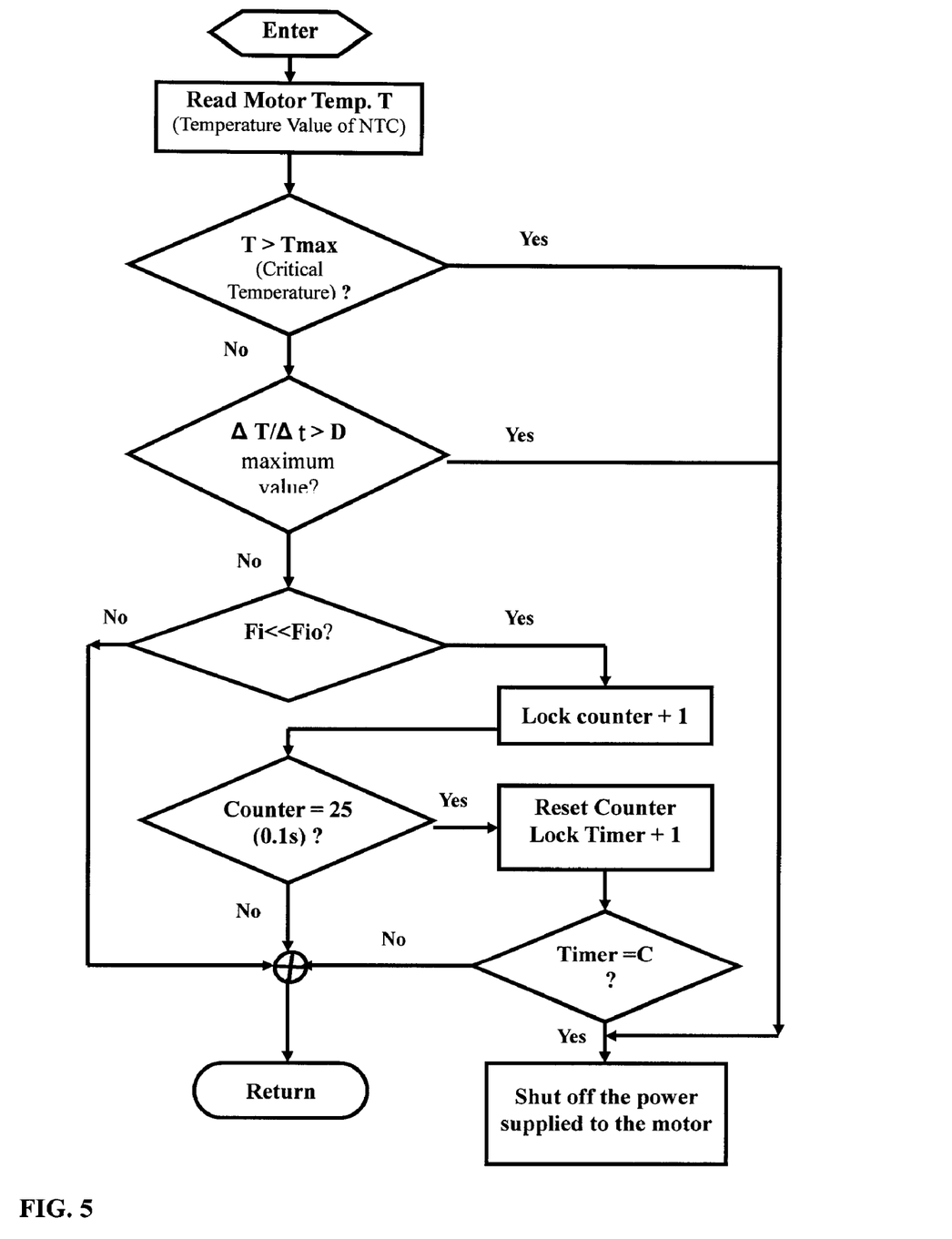
FIG. 5 is a flowchart showing the operation of the electric motor protection system depicted in FIG. 1 in protecting an electric motor from overheating.
Figure 6:
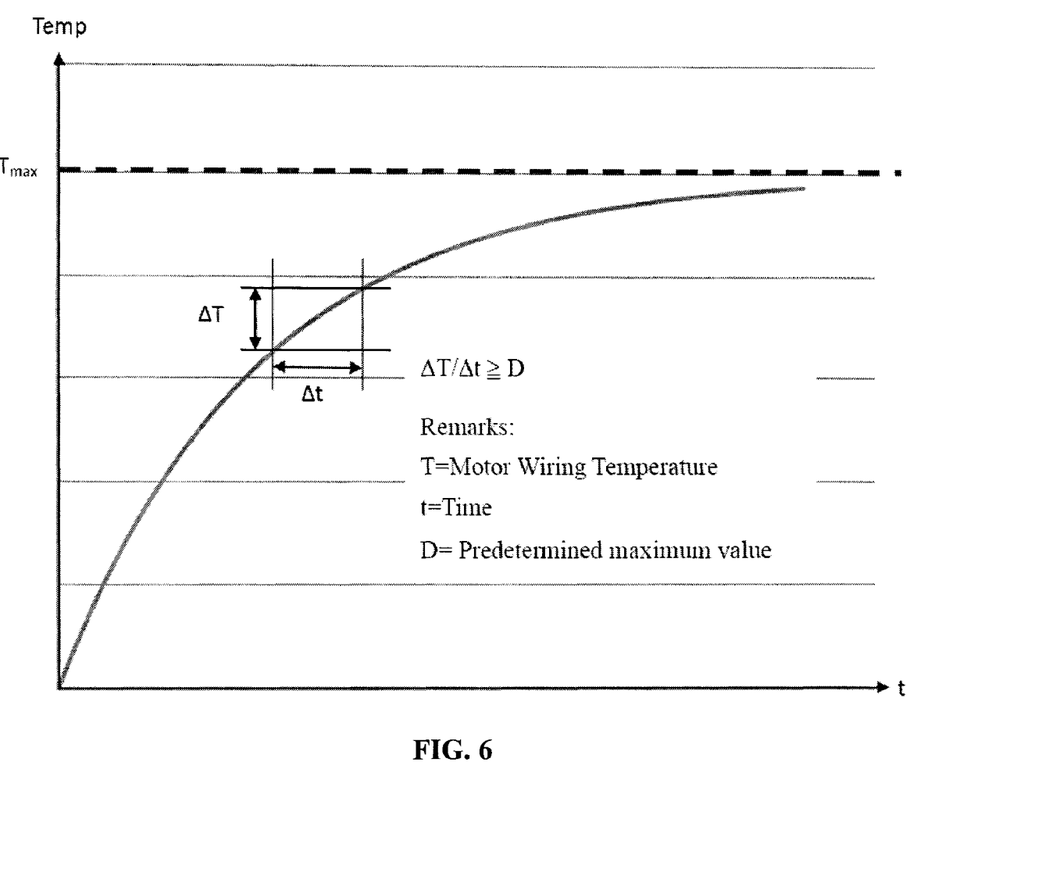
FIG. 6 illustrates the temperature rising curve of the electric motor depicted in FIG. 3.

Referring to FIG. 5 and FIG. 6, to protect the motor 100 from overheating, the signal processing unit 9 first reads the signal T from the temperature sensor assembly 120, which represents the temperature of the motor 100. If the motor 100's temperature reaches a predetermined threshold value $T_{max}$, due to the heavy load on the motor 100, for example, the signal processing unit 9 is configured to shut off the power supplied to the motor 100. The predetermined threshold temperature is generally set by the manufacturer of electric household appliances. In this embodiment, the predetermined threshold value $T_{max}$ is 100 degree Celsius. If the temperature of the motor does not reach the threshold value $T_{max}$, the signal processing unit 9 is configured to determine if the rising rate of the motor 100's temperature is equal to or greater than a predetermined threshold value D. The predetermined threshold value D is generally set by the manufacturer of electric household appliances.

It is noted that in practice, the rising rate of the motor 100's temperature is calculated by the signal processing unit 9 as the ratio of a temperature increase of the motor 100 in a predetermined small time period to the duration of that predetermined time period. The predetermined small time period is generally set by the manufacturer of electric household appliances. Referring to FIG. 6, the temperature rising rate of the motor 100 is defined by:

$$D_i=(T_t-T_{t-1})/\Delta t$$

where $T_{t-1}$ is a previously measured temperature, $T_t$ is a currently measured temperature, and $\Delta t$ is the time duration between the previous measurement and the current measurement. For example, if $T_{t-1}=50°$ C., $T_t=53°$ C., $\Delta t=1$ second, $D_i=(T_t-T_{t-1})/\Delta t=(53-50)/1=3°$ C./second.

In this embodiment, the temperature rising rate threshold value D can be a determined in the following fashion. Let D be $D_{imax}$ at a given point and $$D_{imax}=((T_{max}-T_{t-1})/T_{max})*A_i+B_i$$

where $T_{t-1}$ is a previously measured temperature, $T_{max}$ is the maximum allowed temperature, which is the same as the above-mentioned temperature threshold value, and $A_i$ and $B_i$ are both empirical constant coefficients with the unit to be ° C./second. Thus $D_{imax}$ is a value calculated by the signal processing unit 9 based on $T_{max}$, $T_{t-1}$, $A_i$, and $B_i$. For example, if $T_{t-1}=50°$ C., $T_{max}=100°$ C., $A_i=6°$ C./second, $B_i=2.0°$ C./second, then $D=D_{imax}=((T_{max}-T_{t-1})/T_{max})*A_i+B_i=((100-60)/100)*6+2=5°$ C./second.

It is noted the empirical constant coefficients $A_i$ and $B_i$ are generally different for different types of motor operations. In this embodiment, the motor 100 is used in an electric hand mixer for carrying out different operations such as stirring, chopping, pureeing and etc. The different values of the empirical constant coefficients $A_i$ and $B_i$ chosen for different operations are shown as an example in Table 1.

TABLE 1

| Item | Course | $T_{max}$ | $A_i$ | $B_i$ | $T_{t-1}$ | $T_t$ | $D_i$ | $D_{imax}$ |
|---|---|---|---|---|---|---|---|---|
| 1 | Speed 1 | 100° C. | 2.0° C./sec | 1.0° C./sec | 50° C. | 53° C. | 3.0° C./sec | 2.0° C./sec |
| 2 | Speed 2 | 100° C. | 3.0° C./sec | 1.0° C./sec | 50° C. | 53° C. | 3.0° C./sec | 2.5° C./sec |
| 3 | Speed 3 | 100° C. | 4.0° C./sec | 1.0° C./sec | 50° C. | 53° C. | 3.0° C./sec | 3.0° C./sec |
| 4 | Speed 4 | 100° C. | 5.0° C./sec | 1.0° C./sec | 50° C. | 53° C. | 3.0° C./sec | 3.5° C./sec |
| 5 | Speed 5 | 100° C. | 6.0° C./sec | 1.0° C./sec | 50° C. | 53° C. | 3.0° C./sec | 4.0° C./sec |
| 6 | Speed 6 | 100° C. | 7.0° C./sec | 1.0° C./sec | 50° C. | 53° C. | 3.0° C./sec | 4.5° C./sec |

It is understood that the empirical constant coefficients $A_i$ and $B_i$ are not limited to the values given by this example. In general, these coefficients are predetermined by the specific conditions of the motor 100 as well as the specific operations the motor 100 is intended for.

Figure 7:
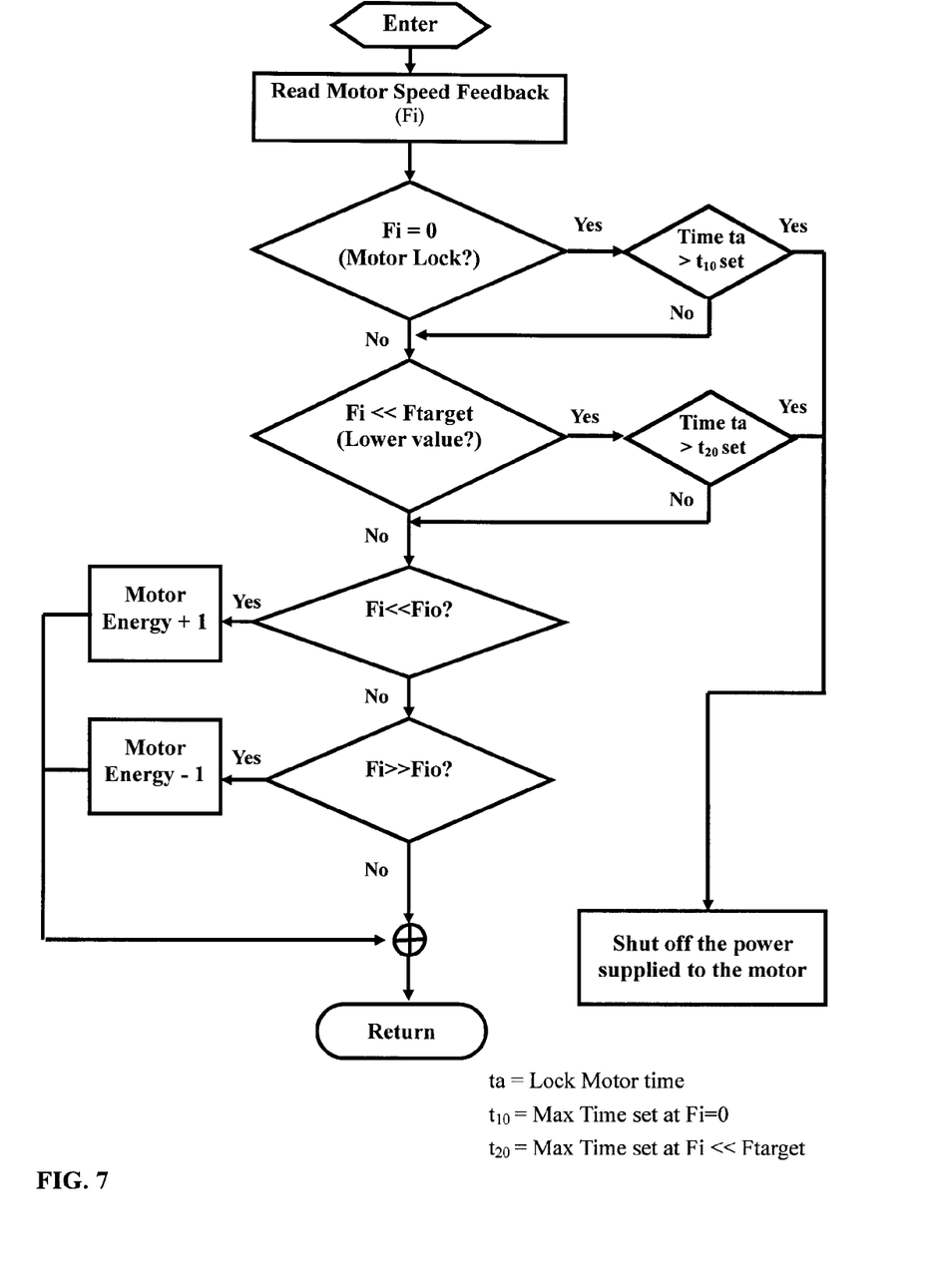
FIG. 7 is a flowchart showing the operation of the electric motor protection system depicted in FIG. 1 in protecting a motor from being overloaded.

Referring to FIG. 7, to protect the motor 100 from being overloaded, the signal processing unit 9 first reads the motor speed feedback signal $F_i$ from the motor speed sensor 130, which represents the actual running speed of the motor 100. If the motor speed feedback signal $F_i$ is equal to zero for a first predetermined period of time $t_{10}$, or significantly lower than a predetermined target value ($F_{target}$) (e.g., Fi<about 30% of $F_{target}$) for a second predetermined period of time $t_{20}$, the signal processing unit 9 is configured to shut off the power supplied to the motor 100 to avoid motor damage due to heavy load or motor locking. $F_{target}$, $t_{10}$ and $t_{20}$ are generally set by the manufacturer of electric household appliances.

Figure 8:
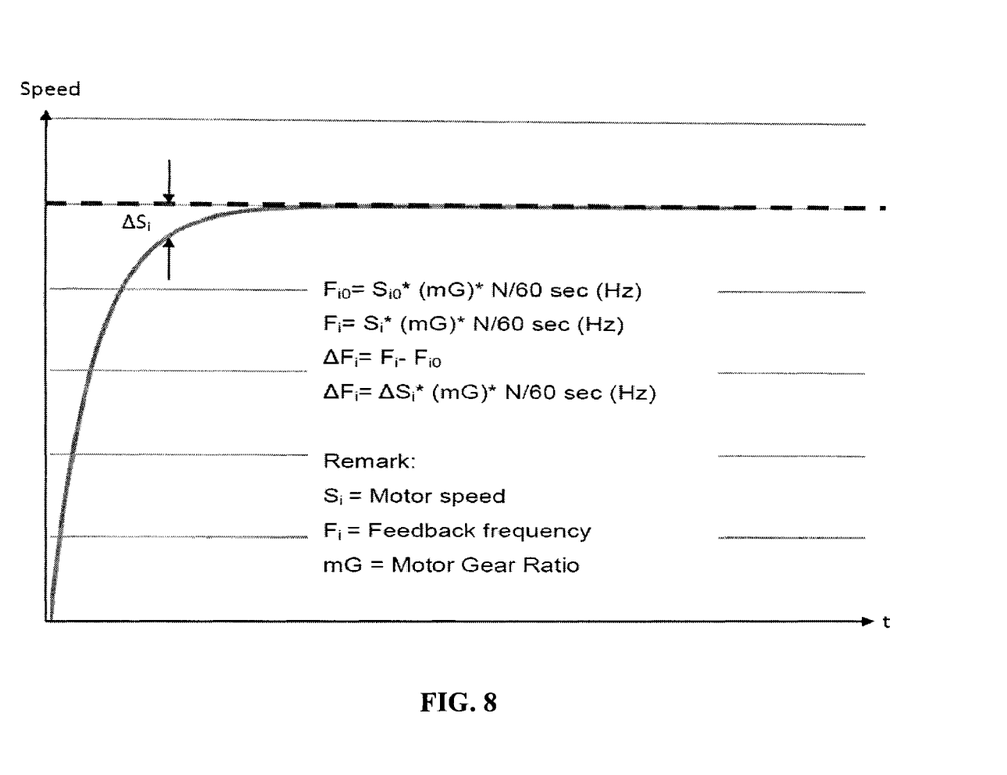
FIG. 8 illustrates the speed of the electric motor depicted in FIG. 3.

If the motor speed feedback signal $F_i$ is neither zero nor significantly lower than the target value $F_{target}$, the signal processing unit 9 proceeds to control the speed of the motor 100. Referring to FIG. 7 and FIG. 8, when the motor is operated to run by a user, the signal processing unit 9 will generate a triggering pulse to drive the power control device 14, which synchronizes with an AC (alternating current) zero-crossing signal if a TRIAC is used in the power control device 14. If a MOSFET is used in the power control device 14, the signal processing unit 9 generates a PWM (pulse-width modulation) triggering pulse for the MOSFET, in order to keep the motor 100's running speed within a desired range. The fire angle for the TRIAC or the PWM ratio for the MOSFET will be determined based on the motor speed feedback signal $F_i$.

The detailed method of motor speed control is described below. Referring to FIG. 8, assuming the motor target speed is $S_{i0}$ rpm, the motor gear ratio is mG, and the number of magnet poles is N. The center feedback frequency from the motor speed sensor 130 is:

$$F_{i0}=S_{i0}*mG*N/60 \text{ sec (Hz)}$$

The actual feedback frequency $F_i$, however, may be not equal to the center feedback frequency $F_{i0}$. The speed error signal $\Delta F_i$ is:

$$\Delta F_i=F_i-F_{i0}$$

If the speed error signal $\Delta Fi=0$, the motor's actual speed is equal to the target speed, and the power supplied to the motor 100 should be kept as it is. If the speed error signal $\Delta Fi>0$, the motor 100's actual speed is higher than the target speed, and the power supplied to the motor 100 should be reduced. If the speed error signal $\Delta Fi<0$, the motor's actual speed is lower than the target speed, and the power supplied to the motor 100 should be increased.

In this embodiment, the power supplied to the motor 100 is given by follow equation:

$$P_{new}=P_{current}+(\Delta F_i/F_{i0})*A$$

where A is a constant value depending on the value of speed error signal $\Delta F_i$. The increased power supplied to the motor 100 functions to increase the speed of the motor 100, and the decreased power supplied to the motor 100 functions to decrease the speed of the motor 100.

Figure 9:
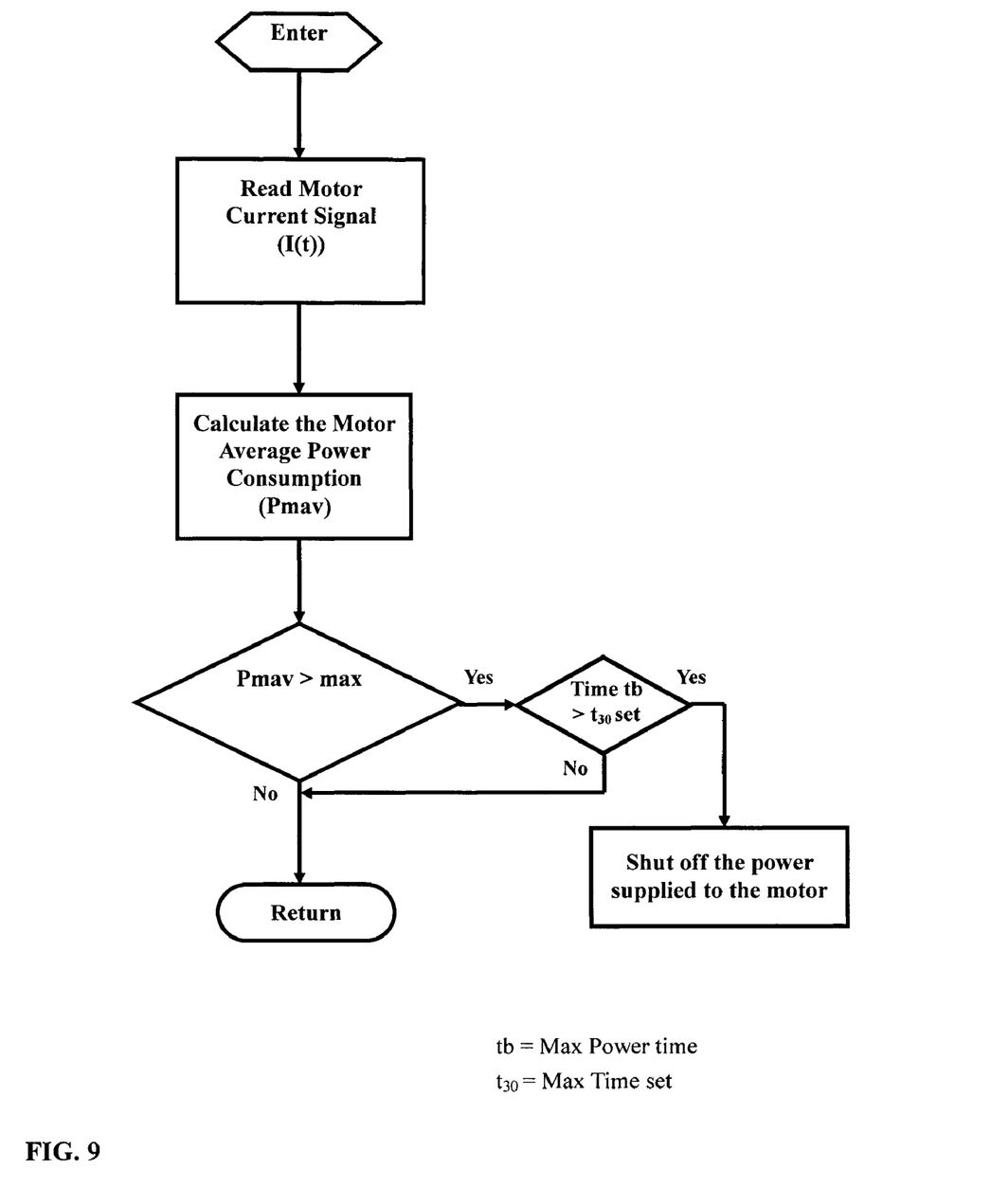
FIG. 9 is a flowchart showing the operation of the electric motor protection system depicted in FIG. 1 in protecting a motor from being driven by excessive current.

Referring to FIG. 9, to protect the motor 100 from being driven by excessive current, the signal processing unit 9 reads the current signal I from the current sensing circuit 16 and calculate the motor's average power consumption $P_{mav}$. The motor power consumption ($P_m$) as a function of time (t) is:

$$P_{mt}=V(t) \times I(t)$$

The motor's average power consumption $P_{mav}$ can be calculated by following formulas:

$$P_{mav} = \frac{1}{T}\int_0^T V(t) \times I_m(t)\, dt$$

$$P_{mav} = \frac{1}{T}\int_0^T V_m \sin(\omega t) \times I_m \sin(\omega t + \varphi)\, dt$$

If the motor's average power reaches or passes beyond a predetermined threshold value $P_{max}$ due to a heavy load for a predetermined period of time $t_{30}$, the signal processing unit 9 is configured to shut off the power supplied to the motor 100, even though the temperature of the motor 100 may have not reached the predetermined threshold value $T_{max}$. $P_{max}$ and $T_{max}$ are generally set by the manufacturer of electric household appliances.

While the present patent application has been shown and described with particular references to a number of embodiments thereof, it should be noted that various other changes or modifications may be made without departing from the scope of the present invention.

What is claimed is:

1. An electric motor protection system for protecting an electric motor of a household appliance, the system comprising:
   a motor speed sensor for sensing a speed of the electric motor;
   a power control device for controlling the electrical power supplied to the electric motor;
   a signal processing unit electrically connected to the motor speed sensor and the power control device, the signal processing unit configured to shut off the electric power supplied to the electric motor when the speed sensed by the motor speed sensor is zero or significantly lower than a predetermined target value for a predetermined period of time;
   wherein when the speed of the electric motor sensed by the motor speed sensor is zero or significantly lower than the predetermined target value, the signal processing unit is configured to control power control device to adjust the power supplied to the electric motor so that the speed of the electric motor is in a desired range of speed values; and the adjustment the power control device makes to the power supplied to the electric motor is proportional to the ratio of the difference between the present speed of the electric motor and a center value of the desired range to the center value of the desired range.

2. The electric motor protection system of claim 1, wherein the motor speed sensor is a Hall effect sensor.

3. The electric motor protection system of claim 1, wherein the power control device comprises a triode for alternating current (TRIAC), and the signal processing unit is configured to generate a triggering pulse to drive the power control device, which synchronizes with an alternating current (AC) zero-crossing signal.

4. The electric motor protection system of claim 1, wherein the power control device comprises a metal-oxide-semiconductor field-effect transistor (MOSFET), and the signal processing unit is configured to generate a pulse-width modulation (PWM) triggering pulse for the MOSFET in order to keep the running speed of the electric motor within a desired range.

5. The electric motor protection system of claim 1, wherein the signal processing unit configured to shut off the electric power supplied to the electric motor when the speed sensed by the motor speed sensor is zero or lower than about 30% of a predetermined target value for a predetermined period of time.

* * * * *